Aug. 4, 1936.                G. TANZI                2,049,754
                           MACARONI DIE
                         Filed April 5, 1934
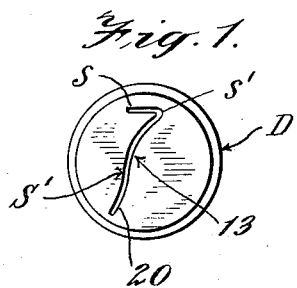
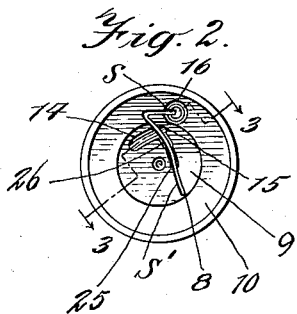
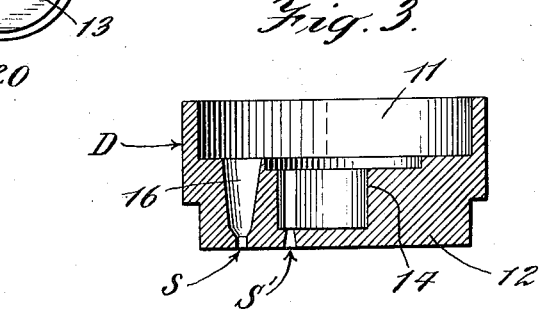
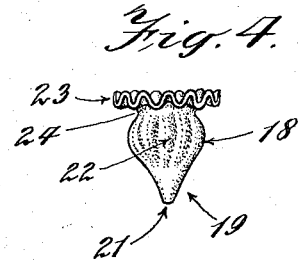
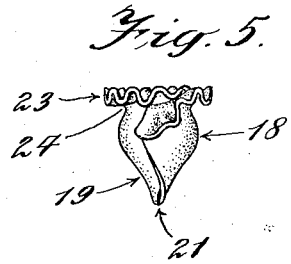
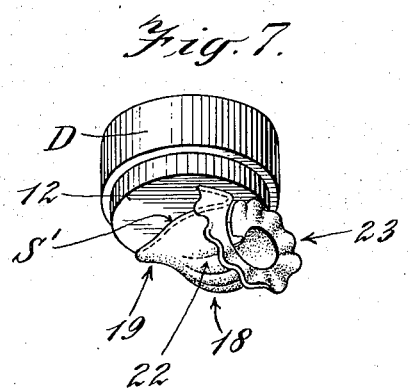
INVENTOR
Guido Tanzi
BY
Waldo M. Chapin
ATTORNEY Patented Aug. 4, 1936

2,049,754

UNITED STATES PATENT OFFICE 2,049,754

MACARONI DIE

Guido Tanzi, Brooklyn, N. Y., assignor to V. La Rosa & Sons, Inc., Brooklyn, N. Y., a corporation of New York Application April 5, 1934, Serial No. 719,082

4 Claims. (Cl. 107—14)

This invention relates to dies for use in the production, by extrusion, of objects formed from a material having the tenacious characteristics of macaroni dough, an important intended use of the invention being to fabricate in rapid succession, a multiplicity of macaroni or noodles of conch-like shape, with corrugated and frilled contours heretofore considered incapable of production by simple extrusion. It will of course be understood that the improved extrusion dies herein disclosed as means to carry the invention into effect, can also be utilized in any field for which they are adapted by the nature of the improvements herein disclosed.

In pursuance of the above general object, a more particular object of the invention is to produce an extruded object, such as a macaroni or noodle, composed of a broad strip of dough-like material, curled spirally around an axis, transversely disposed relatively to the length of the strip, the completed article comprising a shell-like body with a continuous convolute wall, which in longitudinal section at any plane normal to its axis conforms substantially to an ogee curve, one end of this body terminating in a rather closely wound conical shape, while the other end of the body is characterized by a convexly swelling conch-shell shape, defined at its extremity by a rather abrupt spiral constriction, beyond which is a flaring extension or flange. In pursuance of the invention, this flange is of extremely graceful form partaking of the shape of a rosette, constituted by the free spiral end convolutions of the strip frilled throughout this end portion, and so resembling a furbelow, ruffle or ruche in effect.

A helical shaped macaroni product of this improved type is desirable as an article of food, inasmuch as its strip component is substantially of uniform thickness throughout, and can be cooked uniformly in minimum time, while the compact, highly convolute character of the body structure, and the frilled flaring appendage thereto, cooperate to entrain an optimum quantity of sauce, which is the chief factor in the appetizing, successful preparation of such a viand.

In further pursuance of the invention, I have provided a novel means for the fabrication of articles possessing the above described characteristics, such means taking the form of an extrusion die which is characterized by an extrusion orifice adapted to yield a uniformly dependable series of the conch-shaped macaronis by reason of certain operative elements that I have developed by research, also by extended experiments, and the application of theories formulated from principles, some of which are recognized in the extrusion art and others of which involve wholly novel concepts, original with myself.

The above, and other features of the invention, are illustrated and described fully in the accompanying drawing and specification and are point out in the claims.

In the drawing:

Fig. 1 is a plan view of a macaroni extrusion die in the formation of which this invention has been embodied, looking toward the observe or extrusion face of the die.

Fig. 2 is a similar view of the reverse, or charging end of the same die.

Fig. 3 is a view in transverse, vertical section on the line 3—3 of Fig. 2.

Fig. 4 is a view in side elevation of the novel extrusion product fabricated according to the present invention.

Fig. 5 is a similar view looking in the reverse direction.

Fig. 6 is a view in end elevation of the article of Figs. 5 and 6.

Fig. 7 is a view in perspective of the die of Figs. 1–3 with the dough in process of fabrication into the product of Figs. 4–6.

In a now-preferred embodiment of the invention selected for illustration and description, and referring first to the novel extrusion die shown in Figs. 1–3, inclusive, and Fig. 7 the part designated by the reference character D is a die-plug shown as a cup-shaped member having an open end 11 to which the charge of macaroni dough or like tough, plastic material may be introduced, the other end being closed by a wall 12 of substantial thickness, which is pierced by a slot designated generally by the reference character S', and which serves as an orifice through which to extrude by suitably applied pressure, the dough which has been fed into the open, cup-shaped end 11 of the die-plug D.

In conventional practice, several die-plugs are mounted in a die-plate or disc (not shown), provided with recesses or sockets each corresponding in contour with the exterior shape of the die-plug D, and this die-plate is fitted in the bottom of a press-cylinder which is then charged with dough, and a ram is moved into the cylinder to feed the dough forward against the die-plate and into the cavities 11 of the several die-plugs D, passing thence through the several extrusion orifices S'.

In the present instance, I have provided the die-plug with an extrusion orifice adapted to extrude a broad strip of stock having the general configuration of a numeral 7, and it is to be noted that the shank of this 7 has a rather pronounced arcuate shape, as shown at 13.

It is to be observed that the slot S' is sensibly wedge-shaped in cross-section, as shown in somewhat exaggerated fashion in Fig. 3, being slightly wider at the extrusion face of the die than at the charging face thereof; also that the relatively straight slot-end 20 is longer at the extrusion face than at the charging face. The extremity 20 at the extrusion face extends very nearly to the periphery of the die-plug, but the extremity of the slot S' at the charging face terminates at the circle 8 which defines the boundary of a depression 9 in the charging face of the die-plug, surrounded by a shoulder 10.

The additional thickness of the wall 12 at the region of this shoulder makes it possible to run the tool by which the slot S' is formed at a depth suitable to open the slot S' just through the thickness of the wall 12 within the confines of the depression 9, and to continue the operation under the shoulder 10 without changing the length of the tool, thus forming that part of the extrusion slot at the end of 20 which is closed on the charging side by the shoulder 10.

The effect of permitting the dough to spread into the extended end 20 of the extrusion slot is to slow up the extrusion at the region which forms the small conical end region 19 of the conch-shaped body portion of the product. (See Figs. 4 and 5.)

Reverting now to the charging face of the die-plug, it will be noted that the region 25 of the charging opening of the slot is widened to approximately the width of the slot at the extrusion face, and that there is a further widening of the charging opening of the slot at the region 26, and I have provided, in communication with this portion 26 an enlargement 14 in the form of a counter-slot or recess, which preferably extends to a considerable distance from the slot S' and extends nearly through the wall 12, as shown in Fig. 3, so that the recess 14 is adapted to supply a greatly increased proportion of the material to the extrusion orifice at the curved region 13, as compared with the supply fed through the narrower portions of the slot S'.

The small, semi-circular extension 15, of the recess 14 beyond the slot S' is of negligible importance, being, however, an advantage in forming the recess 14, which is routed out with a round tool, and it may be that the presence of this slight extension aids in a uniform distribution to the curved slot portion 13, of the desired supply of material.

My die is further characterized by the novel combination, with the distinctive middle extrusion features just described, of a lesser enlargement 16, preferably of conical shape, as shown in Fig. 3, and formed around an axis coincident with the extremity s of the slot S', as clearly shown in Figs. 2 and 3.

The conical enlargement 16 is shown as somewhat smaller in capacity than the enlargement 14, and extends very nearly through the wall 12, being in communication throughout its length with the slot end s which portion of the slot may be slightly narrower than the bend s' of the slot, i. e., that portion of the slot intermediate the curved portion 13 and the end portion s.

In the operation of the die-plugs of the novel structure described, several of the die-plugs having been fitted in a die-plate (not shown), and the latter assembled in the conventional manner with the cylinder and plunger of a macaroni press, the dough will enter the cavity 11 of each die-plug when its plunger is advanced to apply pressure to the dough in the cavity 11, and the dough will be extruded from the extrusion slot S' in the manner illustrated in perspective in Fig. 7, the leading end of the extruded strip curling around toward the face of the die-plug as indicated, by reason of the larger amount of material and freer passage thereof afforded by the enlargement portion 14.

In this operation, the body or conch-like central shell portion 18 formed in free spiral convolutions of gradually increasing size around an axis extending transversely of the length of the broad strip being extruded, with the convolutions at one end 19 being more closely wound as they proceed from the relatively straight end portion 20 of the slot S', so that the tip 21, of the product is conical in shape.

The body portion 18, formed by the curved slot-portion 13, swells out in the shape characteristic of a conch-shell, and it will be observed that in the instance illustrated, the characteristic generatrix curve of the strip component is approximately that of an ogee curve, upon any cross-section of the strip lying in any plane normal to the axis of generation.

In this body portion are formed by the simple act of extrusion, corrugations 22, like those of a melon, which are due, in part at least, to the slight retardation of the leading end of the strip portion escaping at the curved portion 13 through the middle discharge portion of the V-shaped slot, as it curls into contact with the face of the die. (See Fig. 7.)

The flaring extension 23 of the product, which is a novel characteristic thereof, in pursuance of the invention, is formed by that portion of the slot S', between the end s and the bend s', this bend in the slot forming the deep constriction 24 in the material which defines that end of the body, while the excess of material and freer passage provided by the end enlargement 16, already described, causes the frill formation in the flaring end 23.

All of these phases of the unitary extrusion operation cooperate and result in the formation of the type of article illustrated in Figs. 4 to 7 inclusive.

When viewed from the aspect shown in Figs. 4 and 5, the product exhibits the shape characteristic of a conch-shell, with the added effect of the terminal frill or ruffle 23, which is an entirely novel feature characteristic alone of my improved product.

This frill takes the aspect of a rosette when viewed endwise as shown in Fig. 6, and renders the product an extremely attractive viand, the free spiral convolutions of the rosette, and their frilled appearance lending an enhanced effect to the same.

The compact spiral structure formed by the coiled strip, which is of substantially uniform thickness throughout, gives access to the cooking fluid, so that it is possible to cook these macaronis or noodles quickly and uniformly; and the crevices between the convolutions of the body 18, and in the corrugations 22, and in the neck 24, and frills 23, serve to entrain an optimum amount of sauce, which makes the article an unusually toothsome viand.

While there may be desirably some variations in proportion and contour provided for by suitable structural variations in the die-plug, it is to be noted that, after each completed article of macaroni has been severed, (as by a suitable knife, not shown), in the conventional manner, and at the stage of the operation indicated in Fig. 7, it will present substantially the appearance shown in Figs. 4, 5, and 6, and if desired it may be aided to assume a closely coiled effect by rolling the articles loosely back and forth on a shaking screen, according to the method disclosed in my copending application, Serial No. 679,667.

I claim:

1. An extrusion die of the class described, having a wall with an extrusion orifice having the general contour of the numeral 7 and adapted to produce, by simple extrusion, a broad strip of trough, dough-like material coiled spirally upon itself in the form of a conch-shell, having at one end a conical winding and at its other end a flaring extension divided from said shell or body portion by a deep constriction.

2. An extrusion die of the class described, having a wall of substantial thickness formed with an extrusion slot extending through said wall and terminating in an extrusion orifice having the general shape of the numeral 7, the slot being of sensibly greater length at said extrusion orifice than at the charging end of said slot, and said slot being adapted to produce, by simple extrusion, a broad strip of tough, dough-like material coiled spirally upon itself in the form of a conch-shell, having at one end a conical winding and at its other end a flaring extension divided from said shell or body portion by a deep constriction, said flaring extension being further characterized by a deeply frilled contour, presenting the effect of a spiral ruffle or rosette when viewed end-on, the convolutions forming said rosette being spaced freely from each other to afford interstices to entrain cooking fluid and sauce.

3. An extrusion die characterized by a cup-shaped open charging end and by an end-wall provided with an extrusion orifice in the form of an elongated slot having generally the contour of the numeral 7, the shank of said 7 being arcuate in form.

4. An extrusion die characterized by a cup-shaped open charging end and by an end-wall provided with an extrusion orifice in the form of an elongated slot having generally the contour of the numeral 7, the shank of said 7 being arcuate in form, and enlargements at the short end, and at said arcuate portion respectively, both in the charging orifice of said die.

GUIDO TANZI.